United States Patent [19]

Douty et al.

[11] 4,149,624

[45] Apr. 17, 1979

[54] METHOD AND APPARATUS FOR PROMOTING RELEASE OF FINES

[75] Inventors: Donald L. Douty; Roscoe C. Miles, both of Franklin Township, Westmoreland County, Pa.; Paul L. St. Clair, deceased, late of Matewan, W. Va., by E. L. St. Clair, executor, Phoenix, Ariz.

[73] Assignee: United States Steel Corporation, Pittsburgh, Pa.

[21] Appl. No.: 882,494

[22] Filed: Mar. 1, 1978

Related U.S. Application Data

[63] Continuation-in-part of Ser. No. 751,763, Dec. 15, 1976, which is a continuation-in-part of Ser. No. 569,527, Apr. 18, 1975, abandoned.

[51] Int. Cl.² ............................................ B65G 45/02
[52] U.S. Cl. .................................... 198/500; 427/387
[58] Field of Search ............... 198/493, 494, 495, 500; 427/387, 424

[56] References Cited

U.S. PATENT DOCUMENTS

| | | | |
|---|---|---|---|
| 2,216,304 | 10/1940 | Thornton | 198/494 |
| 2,367,609 | 1/1945 | Prins | 198/538 |
| 2,478,230 | 8/1949 | Bouvet | 427/424 |
| 2,604,199 | 7/1952 | Govan | 198/500 |
| 3,017,986 | 1/1962 | Ackles | 198/495 |
| 3,053,371 | 9/1962 | Fischer | 198/500 |
| 3,529,868 | 9/1970 | Hogg | 198/500 |
| 3,681,115 | 8/1972 | Maher | 427/387 |

FOREIGN PATENT DOCUMENTS 26225  12/1963  Fed. Rep. of Germany ........... 198/500

*Primary Examiner*—Robert B. Reeves
*Assistant Examiner*—Richard K. Thomson
*Attorney, Agent, or Firm*—William A. Danchuk

[57] ABSTRACT

An endless conveyor belt apparatus is employed for moving raw materials which are characterized in having fines associated therewith from one point to another. The apparatus includes a silicone-emulsion spraying device for applying an aqueous solution of the silicone-emulsion to the material supporting side of the endless belt in sufficient concentrations to promote the release of the fines from the belt when the material being conveyed is dumped, thereby preventing the undesirable build-up of fines on return idler rolls and beneath the belt at points along the belt's return path.

9 Claims, 9 Drawing Figures

| Pump Setting | Gal of Sil Emul/Day ±3% | % Change |
|---|---|---|
| 1 | .75 | 56.6 |
| 1.5 | 1.175 | 36 |
| 2 | 1.60 | 26.6 |
| 2.5 | 2.025 | |
| 3 | 2.45 | |
| 4 | 3.30 | |
| 5 | 4.15 | |
| 6 | 5.00 | |
| 7 | 5.85 | |
| 8 | 6.7 | |
| 9 | 7.55 | |
| 10 | 8.40 | |

METHOD AND APPARATUS FOR PROMOTING RELEASE OF FINES

This application is a continuation-in-part of application Ser. No. 751,763, filed Dec. 15, 1976 which is, in turn, a continuation-in-part of application Ser. No. 569,527 filed Apr. 18, 1975, previously abandoned.

BACKGROUND OF THE INVENTION

The employment of conveyor belts and endless conveyor belts for moving bulk materials has been known for almost two centuries. Belting systems have been used for conveying materials distances ranging from several yards to many miles. The selection of any haulage system generally depends upon the economics of the situation and the specific material being conveyed. The employment of endless belt conveyor systems have proven economically efficacious in the conveyance of raw materials including coal from the point they are mined to a tipple point removed therefrom. One reason for this is the convenience afforded by portable belt systems which may be added to existing conveyor systems to extend them into newly opened areas of the mine as work progresses.

While endless belt conveying systems have been successfully employed in the handling of raw materials, and especially coal, recent developments in mining safety and in mining as well as belting economics have dictated increased efficiency and safety within the mine. One specific area which has caused a relatively large amount of manpower utilization, safety controversy, and belt wear relates directly to the small particles or fines which are formed when various conglomerate raw materials such as coal are mined and hauled, and which are undesirably retained on the belt subsequent to the dumping of the material being conveyed.

The fines associated with coal conveying have created problems for the last 25 years ranging from belt wear to the requirement that workmen be employed to patrol the length of the belt and shovel back the fines which fall from the belt on its return travel path and build up under the belt. One area which has caused difficulties, relative to efficient belt conveying, concerns the build-up of the fines around and upon the idler rollers which lie below the belt and support the same on its return trip from the belt head, where the material is dumped off the belt, to the tail end, where the material being conveyed is loaded upon the belt. This is especially troublesome when considered in light of the fact that MESA requirements regarding coal dust in mines require water wetting of the belt at the dumping end of the belt, thereby increasing fine build-up along the entire belt. This increased material wetness leads, in almost every circumstance found, to increased fine adhesion to the belt and, consequently, to fine build-up in greater proportions than that realized under "dry" conditions. Fine build-up at these points causes the clogging of the idler rollers which may in turn affect the manner in which the conveyor belt tracks upon the idler rollers. Additionally, fine build-up causes increased friction in the idler roller which results in increased belt wear and possible premature belt wearout or the idler sawing through the belt.

As noted above, the present method of operation is to continue to manually return the fines which fall from the belt during the belt's movement toward the tipple point. This method requires the additional cost of manual labor as well as the very important possibility, which has occurred in the past, that workmen may be harmed or killed in the process. In addition to causing possible injury, belt maintenance is drastically increased when the fines are not removed from the belt as its head end along with the load being conveyed. In particular, maintenance includes belt splicing subsequent to breakage, idler replacement due to increased frictional wearing, rapid corrosive deterioration of the entire belt system and adjacent structures, bearing failure and belt replacement. The latter may be exceedingly expensive in the longer belt systems, costing a minimum of five dollars a foot per 36-inch wide belts for the least expensive variety, and running higher for rubber belts. Consequently, it becomes extremely important to minimize, if not completely eliminate, the build-up of fines under the belt after the belt changes direction and begins its return to the loading point.

The solutions to fine build-up along the return path of the belt are as numerous as the number of belts in use. They have one common area however, and that is their ineffectuality in removing a meaningful percentage of the fines from the conveyor belt. Wipers and scrapers of various configurations and materials have been employed, and are currently employed, in an attempt to remove fines from the belt. Such methods, in addition to being ineffective, cause undesirable increased belt wear and increased costs in their replacement. Washing the belt with plain water has been attempted, but has been generally done away with as causing flooding within the mine area as well as causing the belt to freeze in winter conditions. Moreover, belt washing has been found to be ineffective in reducing fine build-up. Excess water shortens belt life, creates corrosion, and promotes pollution. Brushes, both rotating and stationary, have been used to reduce fine carryover past the head end of the belt. While these attempts have met with limited success in reducing fine carryover, they require enormous amounts of maintenance in order to retain their rather limited effectiveness. Additionally, brushes, because of their necessary contact with the conveyor belt, cause excessive belt wear and generally clog up when used to move wet materials such as coal. Lastly, twisted belt drives have been employed and are characterized in having two 180 degree twists in the belt's path of travel between the head end and the tail end. Such adaptations have limited efficacy in many applications, the least of which is coal mining. In addition, twisted belt drive systems require maintenance, are relatively difficult to operate in confined areas, and are limited to longer belts.

The problem of fines, as suggested above, is not new. Attempts to solve the problem have been prevalent for the last quarter century and have been generally unsuccessful. The problem of fines and a relatively maintenance-free and efficient method for their removal has continued to plague coal operators, as well as those of any raw materials having associated fines. Some of the procedures employed are evidenced in issued U.S. patents as well as foreign patents. Among these are:

1. Hogg, U.S. Pat. No. 3,529,868;
2. Forby et al, U.S. Pat. No. 1,832,374;
3. Bonnet, U.S. Pat. No. 2,478,230; and East German Pat. to Nikol et al, Pat. No. 26,225

The first three of these have been the subject of previous prosecution relative to the parent of this application. All, however, fail to teach or show anything more (relative to fine reduction) than the use of silicone oils as release agents, something known for many years. Thus, they are all directed to the solution of problems independent of the one under consideration here, i.e., what application rates produce the greatest amount of fine release.

SUMMARY OF THE INVENTION

The present invention is addressed to a method and apparatus for conveying materials having fines associated therewith which additionally promotes the substantially complete removal of the fines from the belt proximate the head end of the conveyor belt, thereby preventing their undesirable build-up along the belt's return path of travel. In addition to preventing fine build-up, the present method and apparatus reduces friction between moving parts within the conveyor belt system, thereby extending belt life, repels water from the belt, and promotes the flow of fine coal particles through the coal handling system.

The present method and apparatus includes a mechanism for applying specific critical concentrations of a water-base silicone emulsion in spray form to the material carrying side of an endless conveyor belt, employed within the conveying system, in sufficient strengths and with sufficient frequency to promote the substantially complete release of the material's associated fines at the head end of the conveyor system.

In a preferred embodiment of the invention, a spraying apparatus or atomizer is employed to apply an aqueous solution of the water-base silicone emulsion to the return or bottom side of the endless conveyor belt. The concentration and frequency of application of the solution to the belt is controlled by timers and mixers formed as a part of the spraying apparatus. It is extremely important to apply the solution at the desired location in specifically controlled concentrations (the amount of silicone per square foot of belt) or fine release is not optimized. In particular, insufficient emulsion application results in little increased fine release, while over application, either in amount or in frequency may result in emulsion build-up and consequently, fine build-up on the material carrying side of the belt.

As a result, a primary object and feature of the present invention is to provide a water-base coating to promote material flow on, repel water from, and extend the life of conveyor belts employed in the conveyance of bulk raw materials having fines associated therewith.

Another object and feature of the present invention is to provide a method of conveying materials characterized in having fines associated therewith through the employment of an endless conveyor belt including supporting the belt at and between its two ends, loading the belt, driving the belt and selectively applying a material to the belt in sufficient concentrations to promote the substantially complete release of the associated fines from the belt at the delivery end of the belt and not along the return path of travel of the belt.

Another object and feature of the present invention is to provide and maintain a proper coating of an aqueous solution of a water-base silicone emulsion to a conveyor belt surface to prevent the retention of fines associated with the material being conveyed on the belt.

Still another object and feature of the present invention is to provide and maintain a coating to a conveyor belt which promotes fine release and which decreases frictional wearing of the belt and any associated supporting apparatus therefore.

Other objects and features of the present invention will in part be obvious and will in part become apparent as the following description proceeds.

The invention accordingly comprises the apparatus and method possessing the construction, combination of elements, steps, usage levels, and arrangements of parts which are exemplified in the following detailed description, and the scope of the application which will be indicated in the claims.

BRIEF DESCRIPTION OF THE DRAWINGS

The novel features that are considered characteristic of the invention are set forth with particularity in the annexed claims. The invention itself, however, both as to its structure and its operation, together with additional objects and advantages thereof, will best be understood from the following description of the preferred embodiment of the invention when read in conjunction with the accompanying drawings wherein:

DETAILED DESCRIPTION OF THE DRAWINGS

Figure 1:
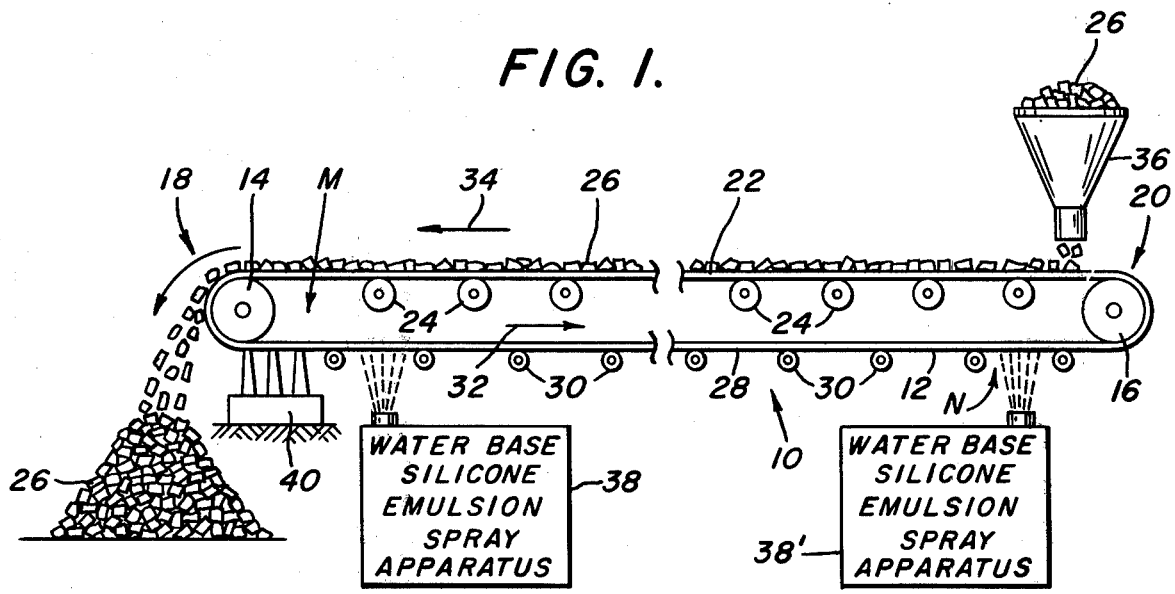
FIG. 1 is a side pictorial representation of a raw materials conveying system according to the present invention with certain portions being shown schematically.
Figure 3:
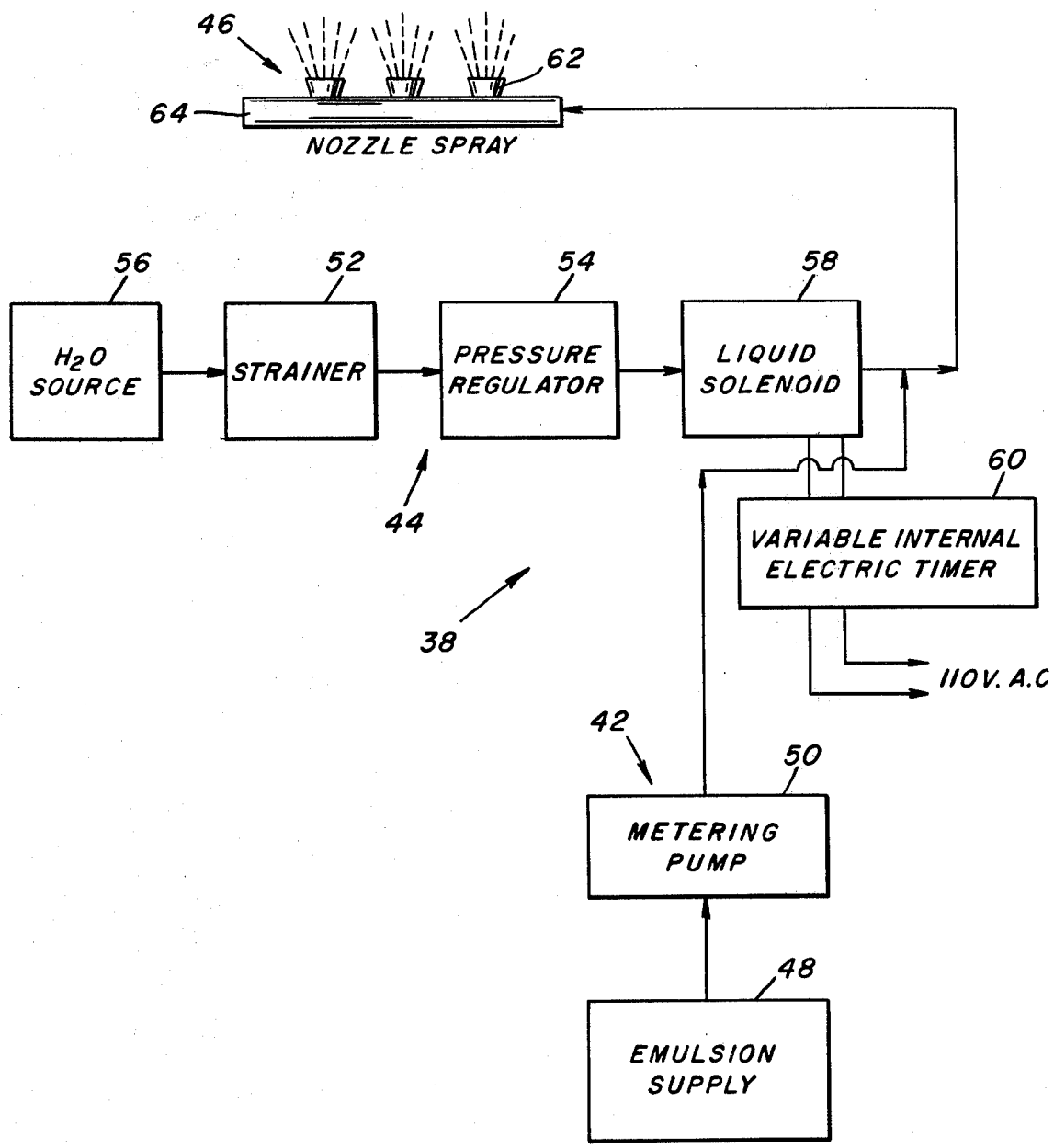
FIG. 3 is a schematic representation of a spraying mechanism incorporated as part of the present invention.

A preferred embodiment of this invention, which may be best understood by first referring to FIGS. 1 and 3 of the drawings, is designed for employment in a raw material environment, and as such, may be suitably employed within a coal mine environment to convey coal from its mining point to a point removed therefrom. As may be evidenced from FIG. 1, a conveyor apparatus is indicated generally at 10. The conveyor apparatus includes an endless conveyor belt 12 which extends between a head pulley 14 located at the head end 18 of the conveyor apparatus, and a tail pulley 16 located at the tail end 20 or loading portion of the conveyor apparatus.

Positioned beneath both the top portion 22 of belt 12 are a plurality of large support rollers 24 which bridge the distance between the tail pulley 16 and head pulley 14. Troughing rollers 24 not only support the belt 12, but provide support for the burden or material being conveyed shown generally at 26. Located beneath the bottom portion 28 of belt 12 are a second series of rollers 30 which bridge the distance between the tail pulley 16 and the head pulley 14. Rollers 30 are idler rollers and are employed for supporting the bottom portion 28 of belt 12 in the belt's movement from the head pulley 14 to the tail pulley 16 as indicated by the arrow 32. In general, the belt 12 is driven through pulleys 14 and 16 in a counterclockwise direction (looking at FIG. 1) as indicated by arrows 32 and 34. The material or burden 26 to be conveyed is loaded upon the tail end 20 of the assembly through any convenient means, e.g. the hopper 36. The material and belt are driven from a point proximate the tail end 20 toward the head end 18 where the burden 26 is released from the belt as the latter changes direction about pulley 14 and commences its return path of travel toward pulley 16, being supported along this travel path by idler rollers 30. It is during this return travel of the belt, from the head end to the tail end of the conveyor belt, that the fines (in this case coal fines) which have stuck to the belt or have been partially absorbed by the belt during conveyance are released and discharged under the belt and upon the idler rollers 30 located proximate thereto. The fines are released during the belt's return due to the jostling given the unloaded belt by the idler rollers 30.

In order to prevent the build-up of fines on and under the belt and upon the idler rollers, a spray apparatus, shown generally at 38, is provided for cooperation with a wiper apparatus 40. The wiper apparatus 40 may be any one of a number of conventional wipers commonly known and employed in the conveyor field, while the spray apparatus 38 is shown in schematic form in FIG. 3.

The spray apparatus 38 functions as a convenient and efficient applicator of an aqueous solution of a water-base silicone emulsion to the material supporting or carrying side of the conveyor belt 12. The spray apparatus 38 generally includes an emulsion segment 42, a water segment 44 and a nozzle segment shown generally at 46. Emulsion segment 42 includes a source to reservoir 48 of a water-base silicone emulsion and a metering pump 50 which functions to pump the silicone emulsion to a junction where it is put into solution with water. Alternately, the water segment of the spray apparatus includes a strainer 52 positioned between a pressure regulator 54 and a source of water generally indicated at 56. Both the silicone emulsion segment and the water segment function within a liquid solenoid 58 which is in turn triggered by a variable internal electric timer 60. The timer 60 is connected to a source of 110 volts AC and functions to turn the solenoid 58 on and off with a given frequency. The liquid solenoid 58 is operative to pump the aqueous solution of the water-base silicone emulsion to the nozzle segment 46 of the spray apparatus; the latter including a plurality of nozzles 62 and piping 64 connecting each of the nozzles to the liquid solenoid 58. The concentration of silicone emulsion within the aqueous solution the same pumped to the nozzles via the liquid solenoid 58 is determined by adjustment of the metering pump 50, the pressure regulator 54, or both.

Figure 2:
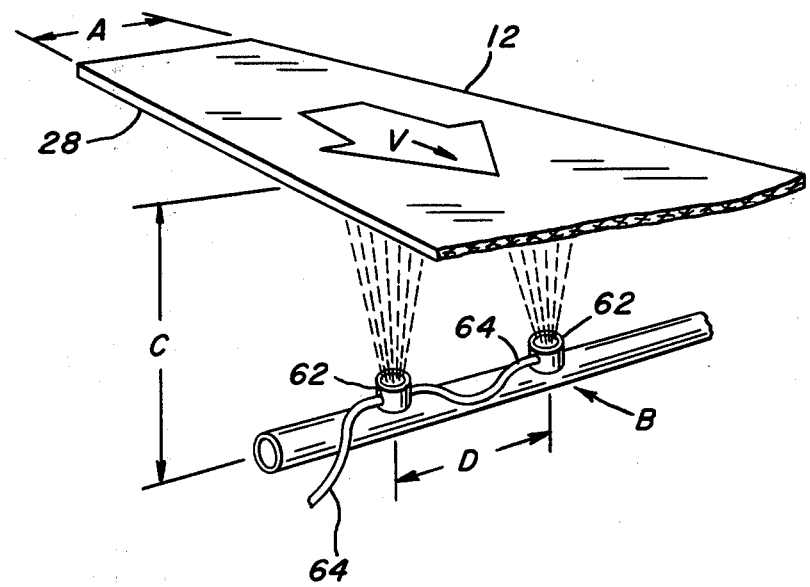
FIG. 2 is a perspective pictorial representation of a portion of the invention of FIG. 1.

The number of spray nozzles 62 required for any given application is dependent upon a variety of parameters. Looking now to FIG. 2, there are indicated the primary variables influencing coating application. A belt 12 having a width "A," having a number "B" of nozzles with small orifices generally in the range of 0.017 to 0.093 inches, which are spaced from each other a distance "D" and from the belt a distance "C" presents a situation in which the proper application of the solution to the belt becomes a solvable problem. It should be particularly noted, for instance, that belt speed affects even the nozzle size, the size being directly proportional to the velocity in order to obtain a constant application of the silicone emulsion and water solution to the belt. Extensive experimentation by the applicants has shown that for a majority of situations, there exists a solution which is best shown in graph form in FIG. 9.

Figures 8, 9:
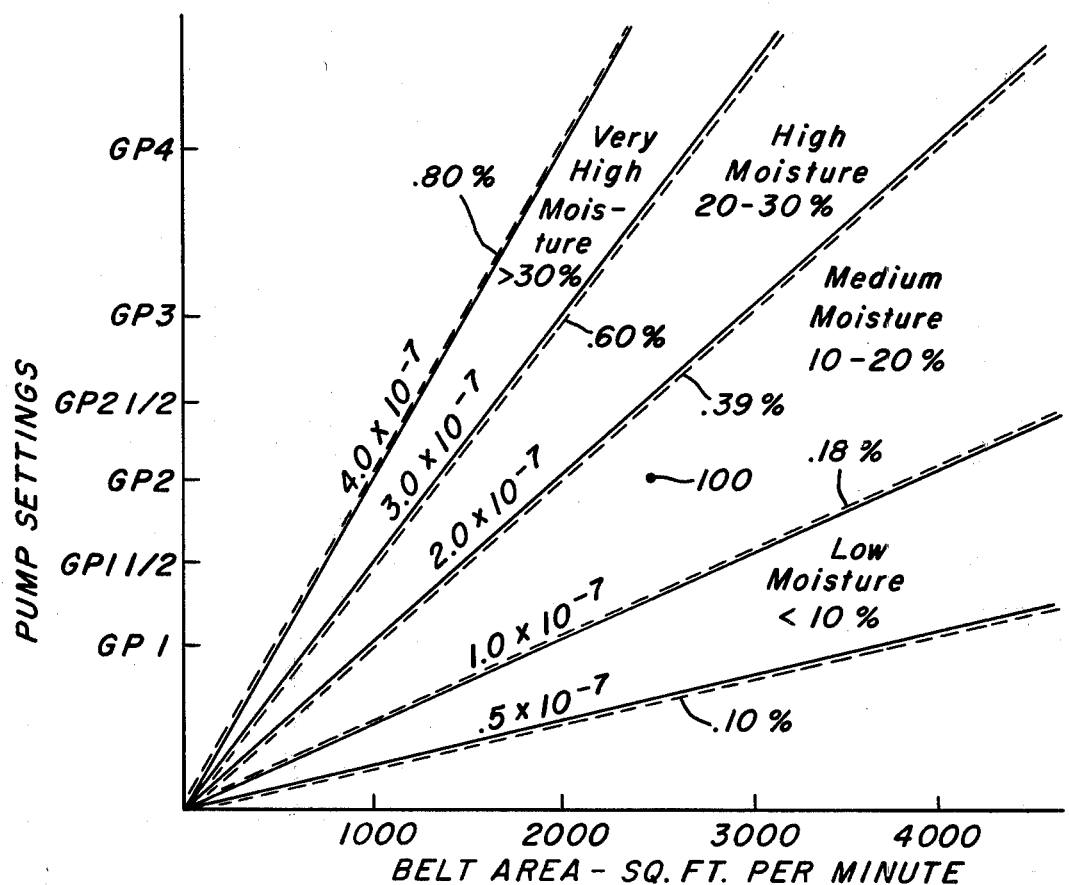
FIG. 8 is a comparison of pump settings versus the amount of emulsion pumped through per day.
FIG. 9 is a graph of efficacious application rates for substantially alleviating fine accumulation on the return trip of a conveyor belt for various product moisture contents.

The graph presented in FIG. 9 should indicate the systematized approach which must be incorporated in the application of the silicone solution to the conveyor belt. It must be additionally emphasized that in addition to providing for the proper application of the aqueous solution, the specific concentration and application rate of the emulsion to water must be determined.

The proper application rate of silicone emulsion and water to the moving conveyor belt will depend upon a great number of varying parameters. Among these are belt speed and the moisture content of the material being conveyed. Applicants' experimentation in the area of fine reduction has shown that no problem exists under dry material conditions (little moisture in the product being conveyed). These optimum dry conditions are seldom found and are literally impossible within ore and/or coal mining situations. Applicants have determined that the amount of silicone emulsion applied to the belt in water solution varies (all else being held constant) directly with the moisture content of the material being conveyed. Additionally, the amount also varies directly with the square footage of belt passing a given point in a given time period, e.g. one minute. This latter determination takes into consideration belt velocity which has been found to be crucial in application rate determination. It should be apparent that (all other conditions being held constant) a belt moving at a greater velocity than another will require more emulsion. The faster belt requires the application of more emulsion for the reason that more square footage of belt is being passed by a given application point than the slower belt. The additional amount required will be roughly proportional to the ratio of the fastener belt speed to the slower. Of course, this determination assumes that all other parameters would not be varied.

While many, if not all, of the parameters noted above may vary, there can still be found a formula for making a determination of the percentage of silicone emulsion which should be applied to produce the most desirable results for the primary parameters. This may be expressed as follows:

$$C = M \times A/E \times C_n \times 10^6$$

where
$C$ = the concentration of the fluid being applied to the belt;
$M$ = the moisture content of the ore material being conveyed;
$A$ = the area of conveyor belt passing a given point during a given time period;
$E$ = the strength of the water-base silicone emulsion as purchased; and
$C_n$ = the total nozzle capacity in a given time period or the application rate of the fluid being applied.

The moisture content of the ore material being conveyed (in percentage of water) may be measured by any one of a number of devices and methods. For example, applicants have found the use of a method which determines moisture content by weight a simple and effective procedure. The ore sample is first weighed and then heated by an infrared source to drive-off the moisture in the sample. The resultant weight difference is then equal to the moisture (by weight) which was in the sample. A device of this type is manufactured by Central Scientific Co. as a "Moisture Determination Balance."

An explanation of determining an application rate of silicone emulsion for a given product being conveyed can be best understood by the use of an example. For instance, in order to determine a pump setting for the silicone emulsion on a five (5) foot wide belt traveling at four hundred (400) feet per minute and conveying a product having a moisture content of 15%, the following calculations should be followed.

FIRST, the area of belt passing a given nozzle application point is:

400×5=2,000 square feet per minute.

SECOND, using this figure one need only find 2,000 on the chart and match the belt area with the proper moisture content, i.e. 15%. In this case, the moisture content of the product falls within the center portion of the 10-20% medium moisture portion of the chart. This point is denoted at 100.

THIRD, by looking to the left hand side of the chart, one is able to find the exact pump setting (for a given type of pump) for optimum minimization of fines. In this case, a setting of "Z" would produce the desired fine reduction for the particular product being conveyed on the particular belt noted above. It should be noted that the setting of "Z" would be increased if the moisture content of the product or the velocity of the belt increase. Moreover, the particular settings indicated depend upon the specific viscosity and percentage of silicone in a given silicone emulsion.

There exist a variety of water-base silicone emulsions which are manufactured by several chemical-based companies. While some have been proven to be much more effective than others, the high viscosity water-base silicone emulsion which has been most effectively employed in the applicants' experimentation is an emulsion, manufactured by Dow Corning Corporation, Midland, Michigan, prepared from a relatively high 100,000 centistoke dimethyl polysiloxane fluid. The emulsion is manufactured having a 35% silicone fluid concentration. For purposes of clarity, all references to emulsion concentrations, unless otherwise noted, are in percentages of a final silicone fluid level in the aqueous solution.

Various other mechanical emulsions exist which have varying degrees of success in the present application. The mechanical emulsions having viscosities ranging both higher (135,000 centistoke) and lower (82,000 centistoke) and which have been tested by applicants as will be discussed below. However, the silicone emulsion produced by Dow-Corning was the only polymeric emulsion tested by applicants.

While solvent base silicone emulsions have been known and used in the past, they are not applicable to the conveyor belt situation presently being considered due to their solvent-based characteristics which promote the disintegration of the belt instead of its regeneration, as does the water-base emulsion. Applicants' major and costly experimentation in the area of coal fines, and testing for their substantially complete release from conveying belts through the employment of a silicone emulsion application, has led to the realization that the application of improper concentrations of the emulsion will produce results similar to those where no silicone emulsion solution is applied. In fact, improper solution concentrations may even produce fine build-up greater than that realized without application.

In this regard, applicants have determined that aqueous solutions characterized in having silicone application rates in the range of about $0.5 \times 10^{-7}$ gallons of silicone fluid per square foot of belt to $4.0 \times 10^{-7}$ gallons of silicone fluid per square foot of belt (depending upon a variety of parameters already discussed and some others which will be discussed) produce a substantial release of coal fines from both rubber as well as polyvinylchloride belting. While this range of concentrations has been found to be effective for a plurality of application situations, it should not be inferred that the range is exclusive of all others. These rates generally correspond to percentages of silicone fluid in the final solution to be applied of between 0.15% to 0.50% silicone. The specific concentrations to be applied must be gauged by the particular nature of the belt and the materials being conveyed. Moreover, the importance of the application point of the solution to the belt should be considered in determining the remaining plurality of parameters which are interrelated with proper solution application. Specifically, the application of the silicone emulsion solution through the spray apparatus 38 at a point "M" (see FIG. 1) proximate the head end 18 of the conveyor apparatus 10 provides for excellent idler roller cleaning and lubrication, while the application of the silicone emulsion at a point "N" (see FIG. 1) proximate the tail end 20 of the conveyor apparatus increase fine release at the dumping point proximate head end 18, and additionally promotes carry-over of the still liquid emulsion solution and its effects to any subsequent transfer device. The efficacy of applying the solution at point "M," point "N," or any point along the belt's return path of travel is dependent upon the specifically defined results which are desired. Moreover, the type of material being conveyed, its moisture content, and its agglomeration characteristics, i.e., the propensity of the material to collect in a mass or cluster, have definite influence upon the concentration, location and frequency of application of the solution through the spray apparatus. It should be additionally noted that applicants' experimentation has resulted in a finding that belt gradient has little effect upon the concentration of solution being applied, its manner and frequency of application, or the location point of application. In fact, solution applications have been made on conveyor belts having gradients approaching 22 degrees without slippage. Therefore, applicants have concluded that solution application does not appreciably affect material slippage on the belt which has been coated.

Figure 4:
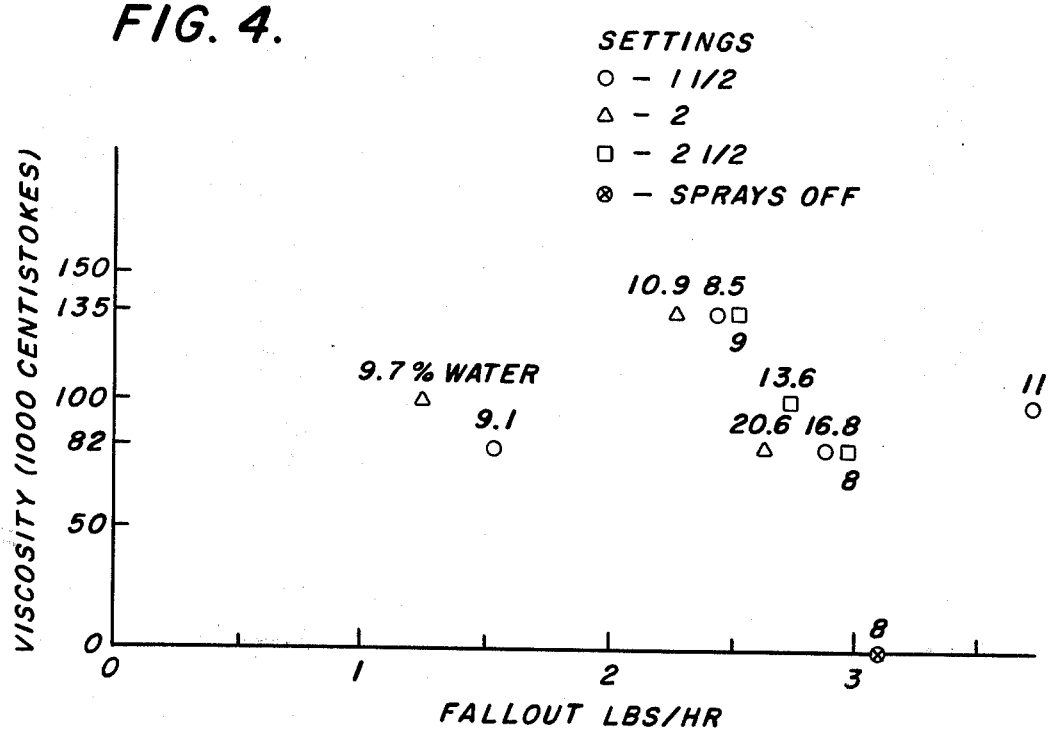
FIG. 4 is a graph comparing the viscosity of the silicone emulsion applied and its application rate versus the amount of fines accumulated under the belt.
Figure 5:
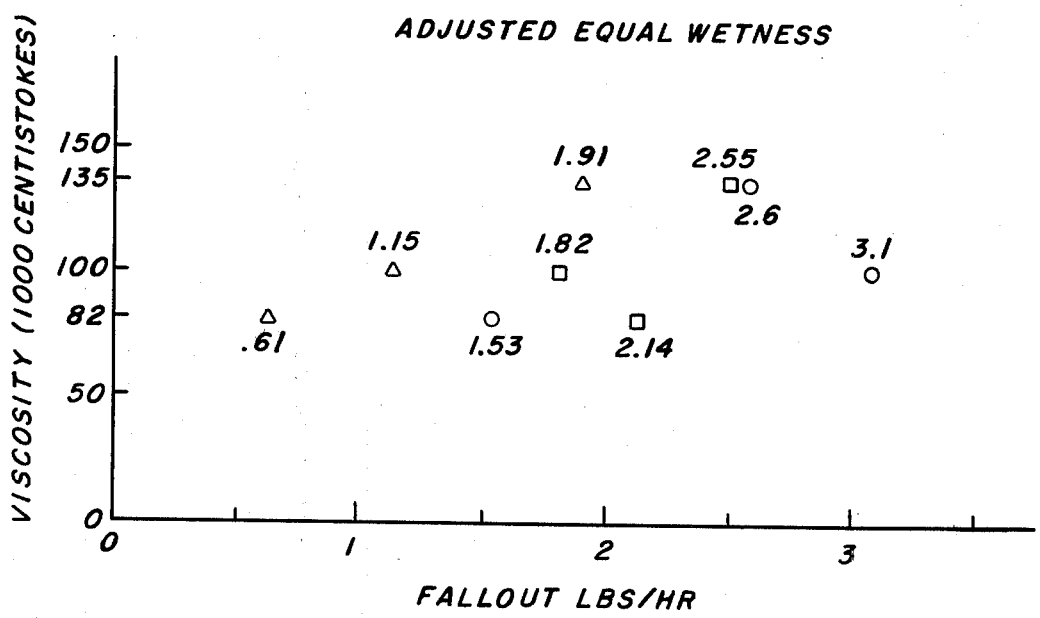
FIG. 5 is the data of the graph of FIG. 4 adjusted for equal wetness.
Figure 6:
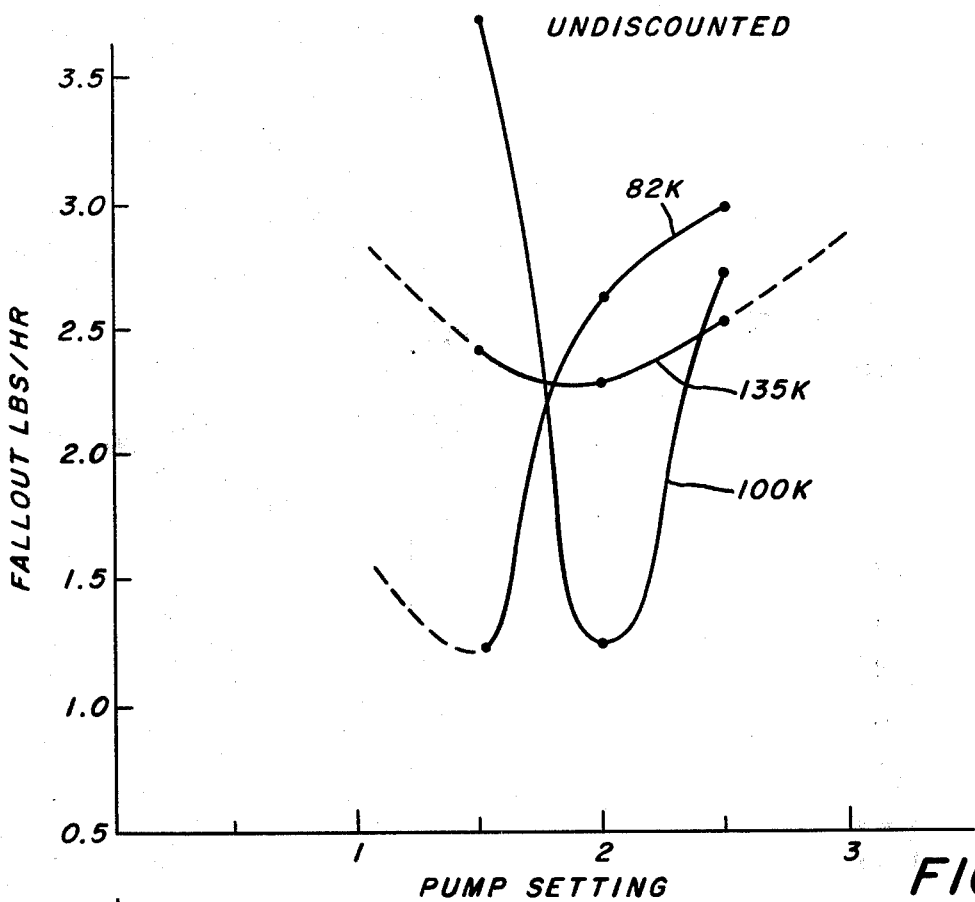
FIG. 6 is a graph of the application rates of the graph of FIG. 4 versus fine production.
Figure 7:
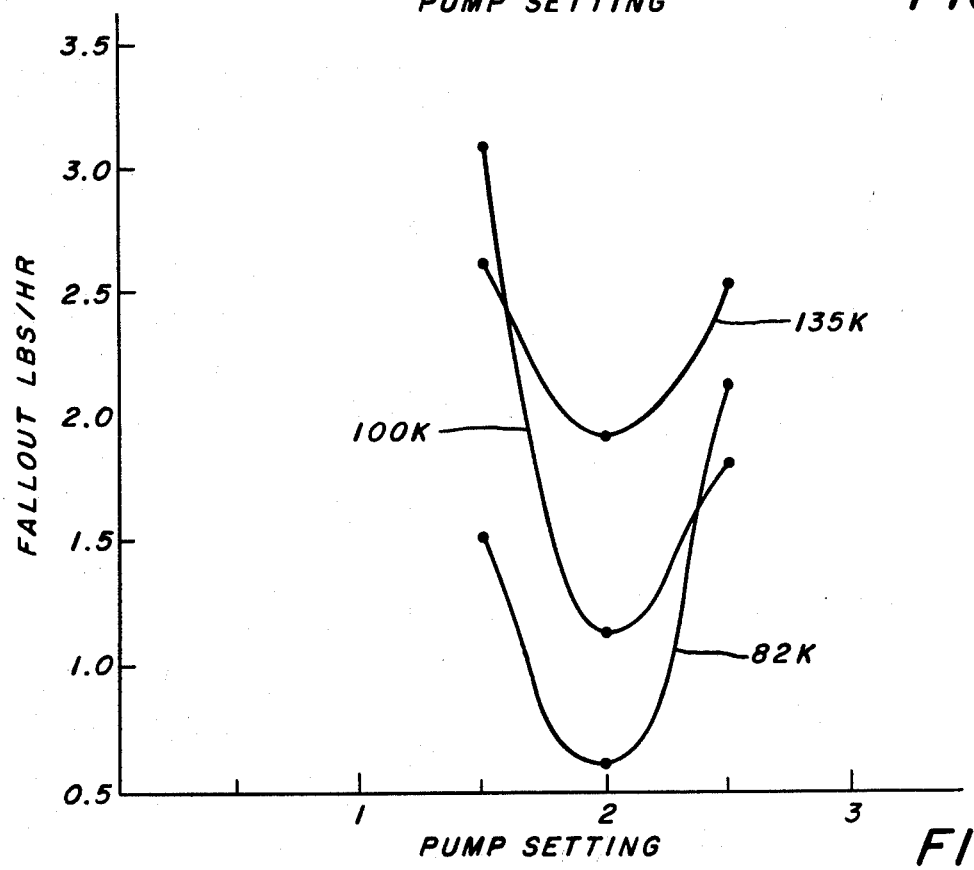
FIG. 7 is a graph of the application rates of the graph of FIG. 5 versus fine production.

The critical nature of the application rates and other parameters may be best appreciated by referring to FIGS. 4 through 8. FIGS. 4 and 5 represent data points accumulated during testing for three different emulsions having viscosities of 82,000; 100,000; and 135,000 centistokes. The three types of emulsions were applied to a single conveyor belt traveling at a constant speed at varying pump settings. Varying material wetness occurred during the entire test. FIG. 4 represents the subject data points without a discounting of varying wetness while FIG. 5 represents the same data points but adjusted for equal material wetness on a relative ratio basis. The graphs of FIGS. 6 and 7 represent the data points of FIGS. 4 and 5, respectively. The main emphasis, however, will be directed in this regard to FIG. 7 which is a wetness corrected representation of the tests conducted.

As may be evidenced from FIG. 7, there is a definite established minimum fallout for a given pump setting of approximately 2 for all three types of emulsions (82K, 100 K and 135K centistokes). At pump settings of either 1½ or 2½ the resultant fallout levels are appreciably increased and produce between 25% to 200% more fines. Pump settings and their relative production output of silicone emulsion are indicated at FIG. 8. The change in silicone emulsion pumped at a setting of 1.5 and 2.0 is only about 27% difference while resultant fine production between the two may be more than 200%. It should be also realized that an "average" coverage of a given square foot of belt is approximately $2.25\times10^{-7}$ gallons of silicone fluid. Accordingly, a 27% change in coverage is not an appreciable change in the actual application of silicone to the belt per square foot. It therefore becomes increasingly apparent that the amount of silicone fluid applied to the belt surface is extremely crucial in reducing the amount of fines falling out below the belt. As may also be evidenced from FIG. 9, the moisture content of the product being conveyed has an important effect upon the application percentage and silicone coverage required per unit area of belt. It is also apparent that varying centistoke rated silicone emulsions produce varying amounts of fallout even at similar settings. It has not been determined whether the emulsion producing minimum fallout under one set of parameters will do so consistently under all others. While one might assume as much, applicants have not collected sufficient data under varying parametic conditions to so conclude. In fact, applicants' empirical studies have indicated that the 100,000 centistoke emulsion has produced the best results. Accordingly, no invariable conclusion in this regard can be drawn.

The application rates in terms of gallons of silicone fluid per square foot of belt indicated in FIG. 9 have a direct correlation to percentages of silicone fluid applied to the belt. These may be seen as dashed lines in the Figure.

While the latter are convenient descriptions of application quantities of silicone relative to water, and are accurate for a majority of circumstances, the former provide the most exact indication of application rates for fine reduction. Again, the limiting percentages indicated in FIG. 9, which correspond to application rates of $0.5\times10^{-7}$ gallons/square foot to $4.0\times10^{-7}$ gallons/square foot are 0.1% and 0.8%, respectively. However, these are extremes and are not generally applicable in the majority of circumstances. In particular, applicants have found, for most general applications, percentages of between 0.15% to 0.5% of silicone fluid in the final solution. These particular percentages correspond to application rates of between $0.9\times10^{-7}$ gallons per square foot and $2.5\times10^{-7}$ gallons per square foot. As previously noted, however, these are "average" or "general" rates of application which may be "violated" in extreme cases of belt speed or moisture content of the product being conveyed.

The theoretical basis for the successful reduction of carryover fines in ore and raw materials handling is directly related to areas of particle physics and small body mechanics. While being complicated, the theory may still be explained to a degree in rather simple terms. The spray unit, when incorporated into a bulk material handling system, uses a dimethyl polysiloxane emulsion. The silicone material has the ability, when applied to belting surfaces, to impart water repellency to that surface. When a conveyor belt repels water it acts as a hydrophobic surface. The surface has no affinity for water and, in fact, attempts to reject it. Surfaces which inhibit or repel water cause it to "ball up" or assume the smallest volume for its relative size which is a sphere. A liquid sphere on a film of silicone has a high contact angle which has been measured on glass to be 90° to 110°. A high contact angle results in minimum particle adherence to the surface due to low surface tension forces and a minimum liquid bridge with low work required for rupturing of the adhesive bond. Liquid films, one of the causes of particle adherence to a surface, are repelled by the hydrophobic surface. The silicone emulsion itself has a very low surface tension which, in turn, promotes high surface activity which prohibits particle retention.

Essential to the release agent qualities of the sprayed emulsion is the amount of silicone applied to the conveyor surface. This point has been underscored throughout the preceeding description. One cannot just apply any amount of silicone in solution onto the belting surface and reduce fine adherence. A low percentage of silicone in the solution being applied to the belt, it has been discovered, and the thin film resulting from its application to the conveyor surface is extremely effective in producing water repellency at low cost with resultant efficient fine reduction.

With the proper location of spray unit or units proximate the "free" portions of the belt (those not loaded with the burden) and the application of precise amounts of silicone solution, clean up maintenance of particles from bulk materials being handled by such conveyors is drastically reduced and less of the material being handled is lost in the transportation process.

It will be seen that by this invention there is provided a method and apparatus for conveying materials having fines from one point to another through the use of an endless conveyor belt assembly, both the method and apparatus including the procedure amd mechanisms for selectively applying an aqueous solution of a water-base silicone emulsion to the belt at a point or points between the unloading point and next loading point (usually along the belt's return path of travel) in concentrations and rates sufficient to promote the substantially complete release of the fines from the belt along with the material being conveyed. The procedure and apparatus of the present invention provides a variety of adjunctive advantages which promote mine safety, increase belt life, and lower mining and haulage costs appreciably. In particular, such areas as drive notor drain, idler wearout, and support roller wearout are all decreased. Furthermore, maintenance costs and manpower, are drastically decreased, resulting in improved operating costs and mine safety. It shold be emphasized that the latter has become and will continue to grow into an important area of concern within any raw material mining and haulage operation.

While certain changes may be made in the above application without departing from the scope of the invention herein involved, it is intended that all matter contained in the above description or shown in the accompanying drawings shall be interpreted as illustrative and not in a limiting sense.

We claim:

1. A method of conveying ore materials characterized in having fines associated therewith from one point to another through the employment of an endless conveyor belt having a tail end proximate said one point and a head end proximate said another point, said method comprising:

supporting said belt at its tail end and at its head end and between two ends so as to provide support for said belt and for the material to be conveyed therebetween;

loading the material to be conveyed upon the belt at a point proximate said tail end of said belt;

driving said belt from said tail end toward said head end thereby conveying the material to said head end, the conveyed material being deposited proximate said head end as said belt begins to change direction and returns to its starting point proximate said tail end; and selectively applying an aqueous solution of a water-base silicone emulsion to the material supporting side of said belt at a point between the head end and the loading point proximate the belt's return path and in a concentration sufficient to promote the substantially complete release of such fines from said belt proximate said head end along with the material being conveyed thereby preventing the undersirable build-up of fines at points along the belt's return path of travel between said head end and said tail end, said concentration of silicone emulsion being within the range of 0.15% to 0.5% of silicone fluid, said concentration being equal to the moisture content of the ore material being conveyed times the area of conveyor belt passing a given point during a given time period divided by the total of the strength of the water-base silicone emulsion times the application rate of the silicone emulsion to the belt for said given time period times a constant equal to $10^6$.

2. A method in accordance with claim 1 wherein said aqueous solution of the water-base silicone emulsion is applied by spraying it upon the material supporting side of said belt.

3. The method in accordance with claim 1 wherein said aqueous solution of the water-base silicone emulsion is applied to the material supporting side of the belt proximate the head end of the belt subsequent to the commencement of the belt's return toward its tail end.

4. The method in accordance with claim 3 wherein said aqueous solution is applied to the belt by spraying it upon the material supporting side of said belt proximate the belt's head end.

5. The method in accordance with claim 1 wherein said aqueous solution of the water-base silicone emulsion is applied to the material supporting side of the belt proximate the tail end of the belt.

6. The method in accordance with claim 5 wherein said aqueous solution is applied to said belt by spraying it upon the material supporting side of said belt proximate the belt's tail end.

7. In an endless conveyor belt assembly, characterized in having a material receiving end, a material delivery end, pulleys located at both enes of the endless conveyor belt about which said belt is moved, and a plurality of support rollers disposed beneath portions of said belt for supporting said belt in its material conveying direction of travel and in its return directionof travel, said belt being suitable for use in conveying ore materials characterized in having distributable fines which are retained on said belt subsequent to the delivery of such materials from said belt at its said material delivery end and which may be undesirably distributed upon said support rollers which support said belt in its direction of return travel, the improvement which comprises providing a coating on the material carrying side of said belt, said coating comprising an aqueous solution of a silicone emulsion in concentrations sufficient to promote the release from said belt of such fines proximate said material delivery end when the conveyed material is dumped, thereby prevention the undesirable distribution of such fines along the path of the return direction of travel of said belt, said concentration of silicone emulsion being within the range of 0.15% to 0.15% of silicone fluid, said concentration being equal to the moisture content of the ore material being conveyed times the area of conveyor belt passing a given point during a given time period divided by the total of the strength of the water-base silicone emulsion time the application rate of the silicone emulsion to the belt for said given time period times a constant equal to $10^6$.

8. The endless conveyor belt assembly according to claim 7 in which said assembly further includes means for selectively spraying said water-based silicone emulsion solution onto said material carrying side of said endless belt subsequent to the dumping of such material and after the belt has commenced its return direction of travel such that such fines are released from said belt during the dumping of the material proximate said delivery end and do not fall upon the support rollers which support said belt during said belt's return direction of travel.

9. In combination, an endless conveyor belt of the variety suitable for conveying ore materials characterized in having fines which may be undesirably released from the material carrying portion of said belt at points dislocated from the material releasing point of said belt, and a coating composed of an aqueous solution of a water-based silicone emulsion for said belt for promoting the release of such undesirable fines from said belt with such materials proximate the material release point of said belt, said solution being composed of between 0.15% and 0.5% water-based silicone emulsion, said concentration being equal to the moisture content of the ore material being conveyed times the area of conveyor belt passing a given point during a given time period divided by the total of the strength of the water-base silicone emulsion times the application rate of the silicone emulsion to the belt for said given time period times an constant equal to $10^6$.

* * * * *

UNITED STATES PATENT AND TRADEMARK OFFICE
CERTIFICATE OF CORRECTION

PATENT NO. : 4,149,624
DATED : April 17, 1979
INVENTOR(S) : Donald L. Douty et al It is certified that error appears in the above-identified patent and that said Letters Patent are hereby corrected as shown below:

Column 6, line 40, change "fastener" to -- faster --.

Column 12, line 1, claim 7, after "both" change "enes"

to -- ends --;

line 18, claim 7, change "prevention" to

-- preventing --;

line 22, claim 7, change "0.15%" to -- 0.5% --;

line 57, claim 9, change "an" to -- a --.

Signed and Sealed this

Twentieth Day of November 1979

[SEAL]

Attest:

RUTH C. MASON
Attesting Officer

LUTRELLE F. PARKER
Acting Commissioner of Patents and Trademarks